Oct. 8, 1968  F. B. SPROW  3,405,059
SETTLING OF EMULSIONS
Filed Aug. 18, 1966  2 Sheets-Sheet 1

INVENTOR.
Frank B. Sprow,
BY
Sylvester H. Brock, Jr
ATTORNEY.

Oct. 8, 1968 F. B. SPROW 3,405,059
SETTLING OF EMULSIONS
Filed Aug. 18, 1966 2 Sheets-Sheet 2

INVENTOR.
Frank B. Sprow,
BY
Sylvester H. Brock, Jr.
ATTORNEY.

United States Patent Office

3,405,059
Patented Oct. 8, 1968

3,405,059
SETTLING OF EMULSIONS
Frank B. Sprow, Baytown, Tex., assignor to
Esso Research and Engineering Company
Filed Aug. 18, 1966, Ser. No. 573,315
26 Claims. (Cl. 210—40)

ABSTRACT OF THE DISCLOSURE

Oil-in-water emulsions are separated by stirring in a mixture with polytetrafluoroethylene chips and then letting the separated water settle from the oil.

---

The present invention relates to the settling of oil-in-water emulsions. More particularly, the present invention relates to the carefully controlled agitation of the emulsion while it is in contact with a specific coalescing surface. In its most specific aspect, the present invention is directed to the settling of an oil-in-water emulsion by agitating the emulsion while it is in contact with polytetrafluoroethylene (Teflon) chips which are freely movable and are to some extent dispersed in the emulsion by the agitation.

The present invention provides a method and apparatus for significantly reducing the time required for settling oil-in-water emulsions. As used in this application, the term "oil-in-water emulsion" shall be deemed to mean any emulsion which comprises an "aqueous" continuous phase and an oily disperse phase. The aqueous phase can include an acid (such as sulfuric acid) in predominant amounts. Where the emulsion is the effluent from a sulfuric acid catalyzed alkylation reactor, the concentration of the aqueous acid (as will be seen later) can be as high as 98 weight percent, while the amount of the acidic aqueous phase in the emulsion can be as high as 80 percent, preferably 50–70 percent. The present invention rapidly separates this type of emulsion, reducing the time during which sludge-forming reactions can take place in the acidic aqueous phase.

From the above discussion, it will be clear that the present invention is advantageous from two standpoints. First, the increase in efficiency will reduce the size of settlers, saving plant space and investment cost. Second, and in some cases most importantly, the decrease in settling time will minimize side reactions which, as in the case of alkylation, lower the selectivity of the reaction and degrade the product.

Settling of emulsions is an old problem. Demulsifying chemicals have been employed in some cases to decrease the settling time as compared to merely allowing the emulsion to remain quiescent in the settling zone. These chemicals cannot be employed in all situations, however, and particularly cannot usually be employed where the aqueous phase is to be recycled to a reaction zone. The use of coalescing surfaces has been suggested in many forms: Edwards et al. Patent 3,179,603 suggests the use of solid polyolefins (such as polyethylene and polypropylene) which would float at the interface in an emulsion settler; Preiser Patent 3,098,108 discloses the use of polytetrafluoroethylene (Teflon) in a settling zone, with the emulsion being flowed first through a bed of chips and then in contact with longitudinally extending pads of Teflon. In neither case was it recognized that mild agitation (with Teflon) could even further substantially decrease the settling time. This was the discovery of the present inventor.

Figure 1:
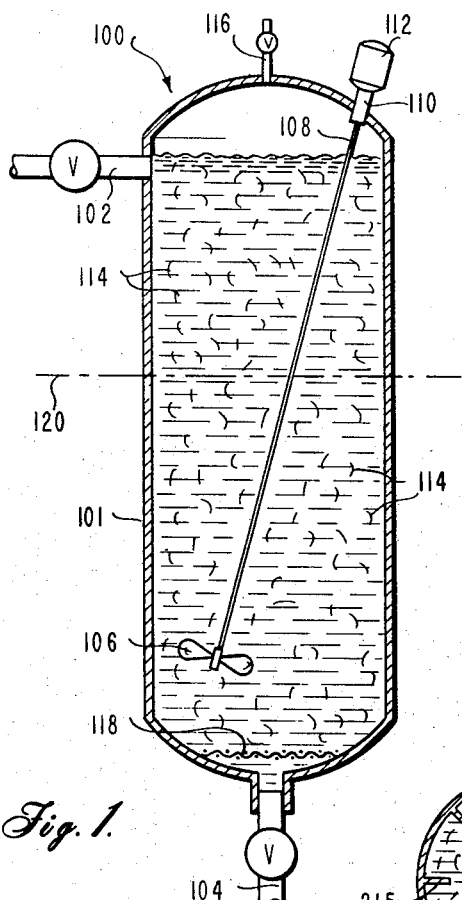
Figure 2:
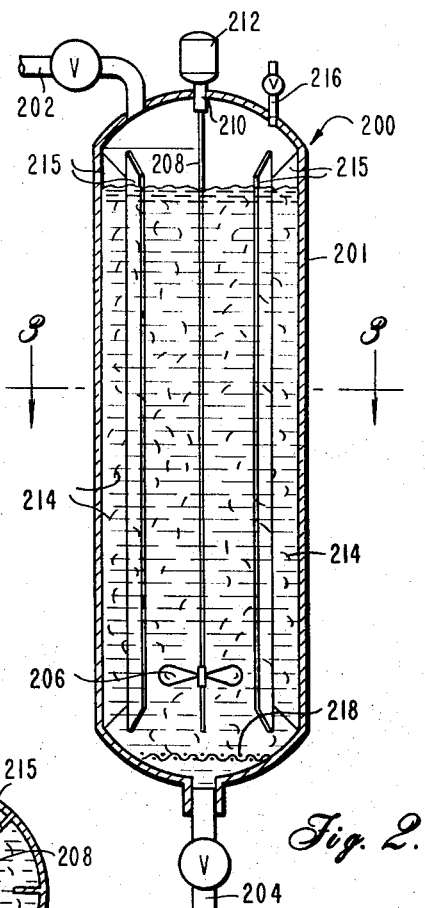
Figure 3:
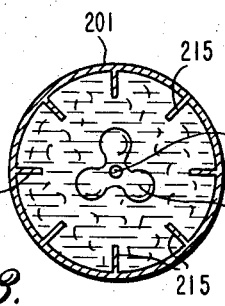
Figure 4:
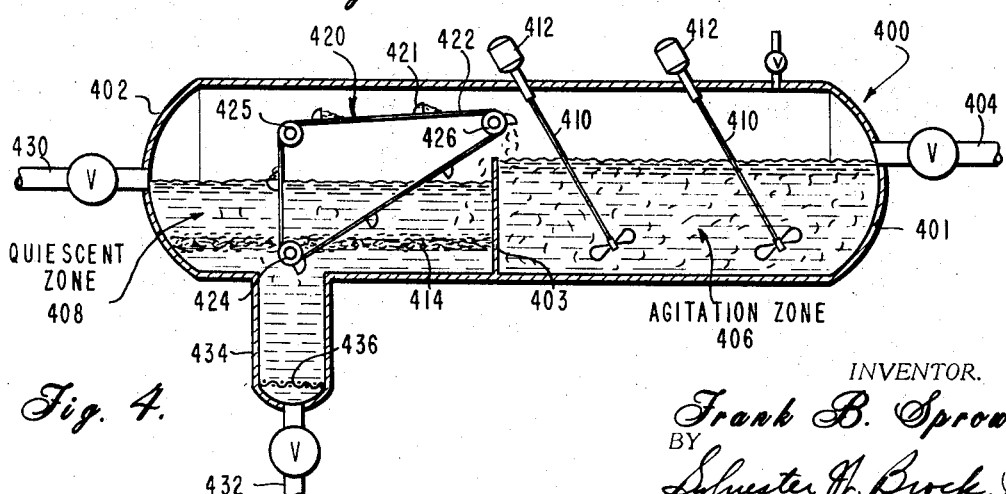
Figure 5:
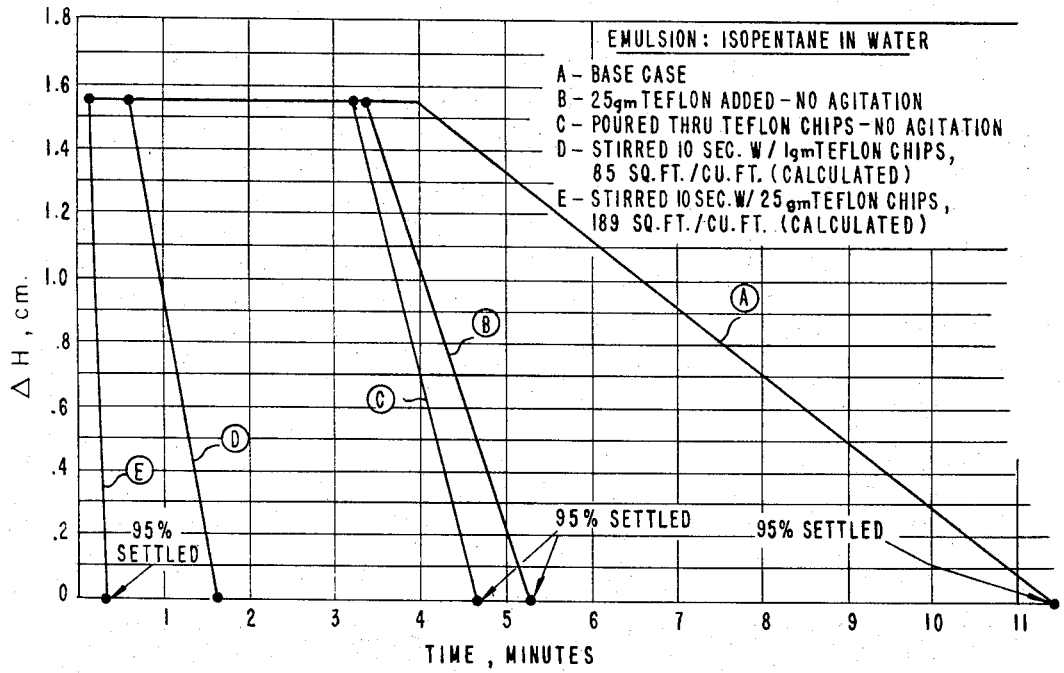
Figure 6:
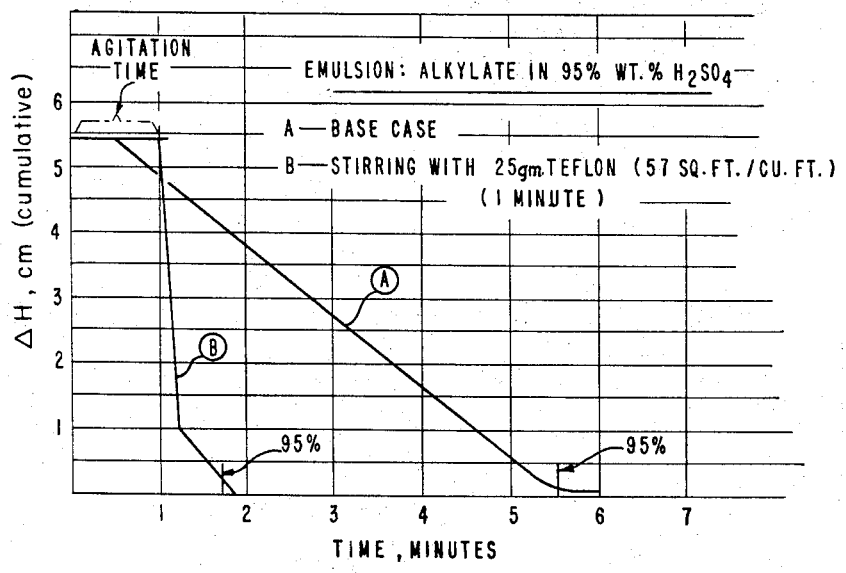

The present invention can best be understood by reference to the discussion and examples hereinafter given, with reference to the drawings wherein:

FIG. 1 is a sectional elevation of one type of settling device for use in carrying out the present invention;
FIG. 2 is a sectional elevation of a second type of settling device for use in carrying out the present invention;
FIG. 3 is a sectional view of the device shown in FIG. 2, in a plane shown by arrows 3—3 in FIG. 2;
FIG. 4 is a sectional elevation of a third type of settling device for use in carrying out the present invention;
FIG. 5 is a set of comparative settling curves for an isopentane-in-water emulsion; and
FIG. 6 is a set of comparative settling curves for an alkylate-in-aqueous sulfuric acid emulsion.

THE METHOD

As has been stated, the present invention comprises a method for settling oil-in-water emulsions. The method is based on the discovery that mild agitation of the emulsion while it is in contact with specific coalescing materials (preferably present as freely suspended chips) will markedly reduce the settling time when the agitation is terminated. Even when considering the agitation period as a part of the total settling time, a substantial decrease in the total settling time is obtained.

The two major variables in the practice of the present invention are (1) input energy and (2) the coalescing surface, including the ratio of coalescing area to emulsion volume. These, and other variables, are discussed below.

*Input energy*

The input of energy must be carefully controlled so that the emulsion is not reconstituted. In connection with a consideration of input energy, the tip speed of the agitating impeller must also be controlled so as to avoid those conditions of high shear which, even at low energy input levels, might cause a reconstitution of substantial portions of the emulsion.

In general, the input energy should be within the range of from 0.005 H.P. per cubic foot of emulsion to 0.05 H.P. per cubic foot. A preferred energy input is 0.01 H.P. per cubic foot. In general, the input energy should be increased as the viscosity of the continuous phase increases (as with a lowering of temperature) and decreased as the viscosity decreases.

There are many ways in which the mixing energy can be applied to the emulsion. The use of a simple blade-type impeller is preferred. When using a rotating impeller, the tip speed should be kept below that at which high shear conditions are created. For most emulsions, this will require operation at tip speeds below about 10 feet per second.

The input energy cycle is designed to optimize the settling rate as measured by total settling time. Thus, the time during which the emulsion is being agitated should be kept at a minimum. This can be done on a batch or semicontinuous basis by activating the agitating impeller for a short period of time (e.g., from 10 seconds to 2 minutes) and then immobilizing the impeller for a short period of time (e.g., from 10 seconds to 3 minutes) to allow the emulsion to separate. The optimum on-off cycle can easily be determined experimentally for a given emulsion under the settling conditions (e.g., temperature and pressure) to be employed. For a 50/50 emulsion of alkylate in 95 weight percent sulfuric acid, a suitable cycle would include an agitation time of 1 minute followed by a quiescent time of ½ minute. For a 50/50 isopentane-in-water emulsion (using soap as an emulsifier), an agitation time of 10 seconds followed by a rest time of 10 seconds would be suitable.

Where a continuous settling process is carried out, the emulsion residence time in an agitation zone would correspond to the agitation time, and the emulsion residence time in the quiescent zone would correspond to the quiescent time.

Coalescing surface

The present invention contemplates the use of polyhalogenated ethylene polymers, particularly polymers of the tetrahalogenated ethylenes. Exemplary of suitable polymeric solids are polyeterafluoroethylene (Teflon) and polytrifluorochloroethylene. These materials can be employed as a coating on the inside of the settling vessel and/or impeller, as freely moving chips or prills, or both. The use of freely moving chips is preferred.

Teflon chips are suitably obtained as scrap (lathe turnings) having a thickness of about 20 to 1,000 microns, a length of about 0.1 to 12 inches, and a width of about 0.1 to 2 inches. These scraps are of random sizes preferably having a minimum dimension as low as 40 microns, a bulk density of about 15–30 pounds per cubic foot, and a surface area of about 5 to 200 square feet per pound. The density of the Teflon itself is about 140 pounds per cubic foot, which allows the chips to move freely in most common emulsions.

The minimum ratio of coalescing surface area to emulsion volume is critical. Below about 5 square feet per cubic foot, there is no substantial improvement as compared to pouring the emulsion over a (larger) bed of Teflon chips. The maximum ratio of chip area to emulsion volume will generally be limited only by mechanical considerations (i.e., interference with the flow of emulsion through the settling device or interference with the agitating means). A suitable upper limit, however, is about 500 square feet per cubic foot.

Keeping all of these things in mind, it is apparent that other variables such as temperature, pressure, interfacial tension, emulsion and constituent densities, percent oil in the emulsion, etc. will be important only as they affect the input energy and surface area requirements.

The temperature must, of course, be such that the emulsion and its constituents are in the liquid phase and of such a viscosity that the separation can be carried out. Where alkylate-in-acid emulsions are being settled, a suitable minimum temperature is about 0° F. The maximum temperature in some cases (such as alkylate settling) may be determined by the rate of undesirable reactions. For alkylate settling, a maximum temperature of 60° F. will generally be suitable.

Pressure is not critical, so long as it is sufficient to keep the emulsion in the liquid phase. A certain amount of the oil phase can be allowed to vaporize, however, and this may be desirable for purposes of autorefrigeration in some cases (such as alkylate settling). A suitable pressure range is from 10 p.s.i.a. to 100 p.s.i.a.

The interfacial tension between the oil and aqueous phases may be important, particularly where emulsifying agents have been employed. Generally, as the interfacial tension decreases, the coalescing area or the agitation (and settling) time may increase, or both. Agitation input energy and impeller tip speed may decrease to avoid reconstitution of the emulsion. A suitable range of interfacial tension for carrying out the present invention can be from 5 dyne per centimeter to 50 dyne per centimeter.

Relative densities of the emulsion and of the constituents thereof affect the rate of separation. The closer the densities are to each other, the slower the separation will tend to be. Thus, as the density differentials decrease, the input energy will decrease and the surface area and total settling time may increase.

It is thus seen that the present invention comprises a method for settling oil-in-water emulsions such as alkylate in sulfuric acid and isopentane in water by agitating the emulsion for a time period from 10 seconds to 200 seconds in contact with a polytetrahalogenatedethylene coalescing surface, at an input energy level from 0.005 H.P. per cubic foot to 0.05 H.P. per cubic foot and a coalescing area ratio from 5 square feet per cubic foot to 500 square feet per cubic foot, a tip speed of less than 10 feet per second, and under conditions including a temperature from 0° F. to 100° F., a pressure from 10 p.s.i.a. to 100 p.s.i.a., and an interfacial tension from 5 dyne per centimeter to 50 dyne per centimeter. The Teflon may optionally be used as chips having a thickness of about 20 to 1,000 microns, a length of 0.1 to 12 inches, and a width of 0.1 to 2 inches.

The remarkable efficacy of the present process will be seen by advertence to the examples later given.

THE APPARATUS

The process can be carried out either batchwise, semicontinuously, or continuously, depending on the type of settling device to be employed.

The simplest device is one similar to that shown in FIGURE 1. In FIGURE 1 a settling vessel 100 is shown which comprises an enclosed vessel body 101 having a means 102 for introducing an emulsion thereinto and a means 104 for removing the emulsion after settling. An impeller-type agitating means 106 is provided which is positioned within the vessel 100 by means of shaft 108, packing gland 110 and is driven by motor means 112. The motor means will be so chosen in combination with the impeller that the tip speed will be less than 10 feet per second, and that the input energy into the mixing zone through the impeller will range from 0.005 H.P. to 0.05 H.P. per cubic foot of vessel volume.

A plurality of polytetrahalogenatedethylene particles 114 are provided within the vessel. These particles, as have been stated above in connection with the process, have a thickness of 20 to 1,000 microns, a length of 0.1 to 12 inches, a width from 0.1 to 2 inches, and a surface area of from 5 to 200 square feet per pound of particles. Quantity of particles in the settling zone is chosen to provide from 5 to 500 (preferably more than 20) square feet of particle area per cubic foot of vessel volume.

In computing the vessel volume, only that portion of the vessel which normally will contain the liquid phase would be included, it being understood that a small amount of vapor space may be maintained above the emulsion surface, and that the vapor can be withdrawn, for example, by way of a vent line 116.

The vessel 100 is also provided with a screen 118 which is dependent from the vessel in confronting relationship to the outlet means 104, whereby the particles 114 are prevented from passing through the outlet means when the settled emulsion is withdrawn.

In the batch or semicontinuous operation of the vessel 100, the valve 104 is closed and the vent valve 116 opened while the vessel 100 is charged with an emulsion through line 102. After the vessel has been substantially completely filled, the valve in line 102 is closed and the impeller motor 112 is activated for a period of about 10 seconds to 1 minute, after which time it is turned off and the emulsion is allowed to settle for a further period of time of about ½ minute to several minutes. At the end of this period of time, the valve 104 is opened and the aqueous phase, which after settling would comprise a liquid level up to the point indicated by the line 120, could be carefully withdrawn until substantially all of the aqueous phase has been removed. A second portion could then be withdrawn, for recirculation into the settling zone, which would comprise the remainder of the aqueous phase plus the first portion of the oil phase. After withdrawing this intermediate decantate, the supernatant oil layer would then be withdrawn and the valve on line 104 would be closed. The back cycle could then be again continued.

In those cases where only a small amount of oil is present in the aqueous phase, the vessel 100 could be operated semicontinuously, withdrawing a portion of the aqueous phase during each quiescent period but accumulating the oil layer until a sufficient amount has been collected to make it efficient to decant the entire vessel.

Referring now to FIGURE 2, a vessel for use in the same manner as the one shown in FIGURE 1 is disclosed. This vessel 200, however, which comprises a body portion 201, has inlet means 202 and outlet means 204 as in the case of the vessel of FIGURE 1. It also is provided with an impeller means 206 driven by way of shaft 208 through packing gland 210 by motor means 212. As in the case of the vessel of FIGURE 1, the vessel of FIGURE 2 can contain chips 214 of a polytetrahalogenatedethylene. The interior of the vessel 200, however, is provided further with a series of vertically disposed baffle means 215, which are dependent from and within the vessel 200, and which serve to assist in mixing the particles 214 with the settling emulsion.

Referring to FIGURE 3, which is a sectional view taken on the line 3—3 of FIGURE 2, the baffles 215 are clearly shown as situated to cooperate with the impeller 206 in causing mixing conditions to be obtained.

With respect both to the apparatus shown in FIGURE 1 and the apparatus shown in FIGURE 2, the interior of the settling zone and/or impeller may be coated with a polytetrahalogenatedethylene, as well as employing the polymer particles. In the event that the interior of the settling vessel is coated (including the baffle), the exposed coated area will be added to the surface area of particle in determining the total amount of particle to be employed. In some situations, the device of FIGURE 2 can be employed wherein the baffles and interior surfaces of the vessel 200 are coated with the polytetrahalogenated ethylene, and/or the ratio of exposed interior surface to interior volume of the vessel is such that the particles are not required. However, it is preferred even in those instances, to employ the chips as a supplemental coalescing medium.

FIGURE 4 schematically discloses an apparatus whereby the method of the present invention can be carried out continuously. The apparatus is seen to comprise an elongated horizontally disposed vessel 400 having an inlet end 401 and an outlet end 402. Wier means 403 are disposed within the vessel intermediate the inlet end and the outlet end, dividing the vessel into an agitation zone 406 and a quiescent zone 408. Impeller-type agitation means 410 are provided in the agitation zone, driven by motor means 412, providing a total input energy from 0.005 H.P. to 0.05 H.P. per cubic foot of agitation zone volume, and at an impeller tip speed of less than 10 feet per second. In determining the agitation zone volume, only that portion which lies below the level of liquid retained behind the wier 403 will be included.

As in the case of the apparatus in FIGURES 1 and 2, a plurality of polytetrahalogenatedethylene particles 414 are freely contained within the vessel 400, both in the agitation zone and in the quiescent zone. The particles are similar to those employed in the other vessels, but the quantity of the particles to be employed must be increased to account for the fact that an inventory of particles will be maintained in the quiescent zone 408. Thus, the amount of particles will be chosen to provide a surface area of particles within the agitation zone of from 5 to 200 square feet per cubic foot of agitation zone volume, and also an additional quantity of particle sufficient to provide from about 20 to 200 square feet of particle per cubic foot of quiescent zone volume.

In order to maintain the inventory of particles in the agitation zone within the desired limits, the apparatus in FIGURE 4 is provided with conveyor means 420 which passes through the interface layer in the quiescent zone, picks up particle chips by means of foraminous baskets 421, and returns particles to the agitation zone 406. As shown in the apparatus of FIGURE 4, the continuous conveyor comprises the foraminous baskets 421 suspended from continuous belt 422 which is entrained over a plurality of rollers 424, 425, and 426, one of which will be driven by means not shown at a rate chosen to maintain the proper amount of particle recycle.

During the operation of the apparatus shown in FIGURE 4, the emulsion is introduced into the agitation zone 406 by means of the inlet 404, and is there admixed under mild conditions of agitation with the polytetrahalogenatedethylene and is allowed to spill over the wier 403, along with a portion of the polytetrahalogenatedethylene particles into the quiescent zone 408, within which it will separate into an aqueous layer and a supernatant oil layer. The polytetrahalogenatedethylene particles will, in many cases, collect at the interface of the two phases.

The conveyor means 420 is provided for maintaining the proper amount of particles in the agitation zone. Thus, the rate at which the conveyor is driven will be chosen so as to return to the agitation zone approximately the same quantity of particles as are passed over the wier 403.

The oil phase is withdrawn by way of line 430 from the quiescent zone, and the aqueous layer is withdrawn by way of means 432, suitably from a dip leg or boot 434. Although not absolutely required, it may be desirable to provide boot 434 with a screen 436 which obstructs the outlet 432 and prevents the polymer chips or particles from being passed through the outlet upon a complete draining of the device.

Thus, it is seen that the present invention can be carried out batchwise, semicontinuously, or continuously in the apparatus disclosed above, and in similar apparatus which performs in substantially the same manner.

EXAMPLES

In order to better understand the invention, certain examples are set forth hereinafter which contain data obtained with laboratory apparatus. All experiments were carried out in laboratory mixers equipped with stirring devices comprising either a 1½- or 1¾-inch impeller positioned near the bottom of the vessel. The impellers were driven by variable speed motors at the various r.p.m. and horsepower inputs which are later set forth. The vessels were provided with rulers whereby the height of the emulsion could be read directly at predetermined increments of time, so as to obtain a measured rate of decrease in the height of the emulsion layer. In those runs where contact with Teflon was desired, a measured amount of Teflon chips (obtained as waste from turning Teflon stock on a lathe) was introduced. The chips were of such sizes that the surface area was about 2 square feet per 25 g. of Teflon chips.

Example 1

Water (150 cc.) and isopentane (150 cc.) were emulsified in a laboratory mixer using 500 p.p.m. of a soap solution as an emulsifier. The resultant emulsion (300 cc.) was introduced into the apparatus and mixed well for a period of 3 minutes at an impeller tip velocity of 70 ft./sec. (in order to assure that the emulsion was complete).

In the following runs, the horsepower input during the mixing stage was about 0.1 H.P. per cubic foot of emulsion. During the agitation at a slower speed, the horsepower input was 0.01 H.P. per cubic foot. The impeller tip speed at the higher rate was about 70 ft./sec.; at the lower speed, about 10 ft./sec.

In Run 1 the mixing without Teflon chips was terminated at the end of 3 minutes and the emulsion allowed to settle without agitation; 11.5 minutes were required for 95% demulsification. The settling curve A shown in FIGURE 5 illustrates the characteristics of unaided settling of the emulsion (as a base case). Note that about 4 minutes were required before perceptible settling was obtained, and that the settling rate thereafter was about 0.86 cm. per minute.

In Run 2, Run 1 was duplicated except 25 g. of Teflon chips were added as soon as the mixing was terminated. Curve B shows the settling characteristics: note that no settling occurred during the first 3½ minutes, and a total time of over 5 minutes was required.

In Run 3, the emulsion was well mixed for 3 minutes, as in Run 1, after which mixing was terminated and the emulsion was immediately poured through 25 g. of Teflon shavings into a beaker to settle. Note that 4.7 minutes were required for 95% demulsification. Curve C illustrates this settling curve for Run 3. Note that over 3 minutes were required before any perceptible settling occurred, after which the emulsion settled at about the same rate as in Run 2.

In Run 4, the emulsion was well mixed for 3 minutes, after which time the emulsion was agitated at a tip speed of 10 ft./sec. for 10 seconds while 1 g. of Teflon was added. Note that perceptible settling occurred almost immediately after agitation was stopped, after which the settling rate was approximately the same as in Runs 2 and 3.

In Run 5, the emulsion was mixed at 70 ft./sec. for 3 minutes, after which 25 g. of Teflon were added and agitation at 10 ft./sec. was continued for 10 seconds and then terminated. The entire emulsion settled within 0.1 minute after the mixer was stopped, or within 0.2 minute after the settling process of the present invention had begun. Note that the settling rate in Run 5 was about 15.5 cm. per minute.

It is thus seen, by a consideration of Example 1, Runs 1 through 5 and by advertence to FIGURE 5, that the present invention has dramatically reduced the time required for settling an oil-in-water emulsion. Run 5 has reduced the settling time of the emulsion from the base case of 11.5 minutes to about 0.2 minute. As compared to pouring the emulsion over a bed of Teflon, the present invention has reduced the settling time from 4.7 minutes to as little as 0.2 minute.

Example 2

500 cc. of plant black sulfuric acid and 500 cc. of plant alkylate are emulsified in a laboratory mixer. The plant alkylate has the following analysis:

TABLE I.—PLANT ALKYLATE

| | Vol. percent |
|---|---|
| $C_6-$ | 6 |
| $C_7$ | 5 |
| $C_8$ | 80 |
| $C_9$ | 5 |
| $C_{10}+$ | 4 |

The black sulfuric acid is about 95 wt. percent $H_2SO_4$ in water, and contains residues from previous alkylation runs. The resulting mixture is exemplary of the type of emulsion which will be encountered in the operation of an alkylation unit wherein isobutane and butylenes are being reacted in a 90–96 wt. percent sulfuric acid catalyst.

In Run 6 (the base case) the emulsion was mixed at an input energy rate of 0.1 H.P. per cubic foot in a 2500 cc. glass vessel, equipped with a stirring device which comprised a 1½-inch impeller positioned about one-fourth of the distance from the bottom of the vessel to the liquid surface. The impeller speed was 700 r.p.m. with a tip speed of 4.6 ft./sec. After mixing for 15 minutes to insure homogeneity, the impeller was stopped and the emulsion allowed to settle. 5.5 minutes were required for settling, as is shown by curve A on FIGURE 6. No perceptible settling was noted until 0.5 minute after the impeller had been stopped.

In Run 2, the emulsion was mixed under the same conditions as in Run 1 for 15 minutes, after which 25 g. of Teflon shavings were added and slow agitation employed for 1 minute at an energy input of 0.01 H.P. per cubic foot, 100 r.p.m., and 0.65 ft. per second tip speed. The mixer was then stopped and the emulsion was allowed to settle. Only 2 minutes were required, including the 1 minute of agitation time. Note that the emulsion began to settle immediately after termination of the slow stirring, and that the rate of settling was extremely great for the first 0.1 of a minute. During this 0.1 minute, 70% of the emulsion settled.

By reference to FIGURE 2, it is seen that an oil-in-aqueous acid emulsion was quickly broken by the practice of the present invention. As used in this application, the term "oil-in-water emulsion" is intended to include oil in aqueous acids such as shown in Example 2.

By reference to the above examples, it is seen that the present invention provides a real, substantial improvement in the settling of oil-in-water emulsions. Although the examples are shown as batch processes, the process is adaptable for continuous operation, as was shown in the discussion of FIGURE 4.

Having disclosed the present invention and the preferred manner of carrying it out in the various examples, that is intended to be covered by Letters Patent should be determined not from the specific examples herein given but rather by the appended claims.

I claim:
1. A method of rapidly settling an oil-in-water emulsion which comprises
  in a settling zone
  contacting said emulsion in the liquid phase with particles of a solid polymer of tetrahalogenated-ethylenes,
  said particles being freely contained in said settling zone,
  while agitating the emulsion under conditions chosen to avoid reconstituting the emulsion,
  terminating said agitation,
  and allowing the emulsion to settle.

2. A method in accordance with claim 1 wherein the hydrophobic solid material is polytetrafluoroethylene.

3. A method in accordance with claim 1 wherein the agitation is accomplished at an energy input level within the range from about 0.005 H.P. per cubic foot of emulsion to 0.05 H.P. per cubic foot of emulsion.

4. A method in accordance with claim 1 wherein the agitation is carried out for a time period of at least 0.5 minute.

5. A method of rapidly settling an oil-in-water emulsion which comprises
  in a settling zone
  contacting said emulsion in the liquid phase with particles of a hydrophobic solid polymer of a tetrahalogenated ethylene, at a ratio of solid polymer surface area to emulsion volume within the range from 5 sq. ft./cu. ft. to 500 sq. ft./cu. ft., said particles being freely contained in said settling zone,
  while agitating the emulsion under conditions chosen to avoid reconstituting the emulsion,
  terminating said agitation,
  and allowing the emulsion to settle.

6. A method in accordance with claim 5 wherein the solid polymer is polytetrafluoroethylene.

7. A method in accordance with claim 5 wherein the agitation is accomplished at an energy input level within the range from about 0.005 to 0.05 H.P./cu. ft. of emulsion.

8. A method in accordance with claim 5 wherein the agitation is carried out for a time period of at least 0.5 minute.

9. A method of rapidly settling an oil-in-water emulsion which comprises
  in a settling zone
  contacting said emulsion in the liquid phase with particles of a hydrophobic solid polymer of a tetrahalogenatedethylene, said particles being freely contain in said settling zone, at a ratio of solid polymer surface area to emulsion volume from 5 sq. ft./cu. ft. to 500 sq. ft./cu. ft. of emulsion volume
while agitating the emulsion at an energy input level within the range of 0.005 H.P. per cubic foot of emulsion to 0.05 H.P. per cubic foot of emulsion
with an impeller having a tip speed of less than 10 ft. per second
terminating said agitation, and
allowing the emulsion to settle.

10. A method in accordance with claim 9 wherein the said polymer is polytetrafluoroethylene.

11. A method in accordance with claim 9 wherein the agitation is carried out for a time period of at least 0.5 minute.

12. A method of rapidly settling an oil-in-water emulsion which comprises
in a settling zone
contacting said emulsion in the liquid phase with particles of a solid polymer of a tetrahalogenatedethylene, said particles being freely contained in said settling zone,
at a ratio of solid polymer surface area to emulsion volume from 5 sq. ft./cu. ft. to 500 sq. ft./cu. ft. of emulsion volume
while agitating the emulsion at an energy input level within the range of 0.005 H.P. per cubic foot of emulsion to 0.05 H.P. per cubic foot of emulsion
with an impeller having a tip speed of less than 10 ft. per second
for a time period of at least 0.5 minute
terminating said agitation, and
allowing the emulsion to settle.

13. A method in accordance with claim 12 wherein the agitation period is about 0.5 minute and the settling period is about 0.5 minute.

14. A method in accordance with claim 12 wherein the emulsion is alkylate in sulfuric acid.

15. A method in accordance with claim 12 wherein the emulsion is a hydrocarbon-in-water emulsion.

16. A method of rapidly settling an oil-in-water emulsion which comprises
in a settling zone
contacting said emulsion in the liquid phase with solid polytetrafluoroethylene particles,
said particles having a thickness of about 20 to 1,000 microns, a length of 0.1 to 12 inches, and a width of 0.1 to 2 inches, and said particles being freely contained in said settling zone,
while agitating the emulsion at an input energy level from 0.005 H.P. to 0.05 H.P. per cubic foot of emulsion,
at a coalescing area ratio from 5 sq. ft. to 500 sq. ft. per cubic foot of emulsion,
a tip speed of less than 10 feet per second,
a temperature from 0° F. to 100° F., and
a pressure from 10 p.s.i.a. to 100 p.s.i.a.,
wherein said agitation period is carried out for a time period from about 10 seconds to about 200 seconds.

17. A method in accordance with claim 16 wherein the interfacial tension is within the range of 5 dyne/cm. to 50 dyne/cm.

18. A method of rapidly settling an oil-in-water emulsion consisting essentially of one volume part of isopentane per volume part of water which comprises
in a settling zone,
contacting said emulsion in the liquid phase with solid polytetrafluoroethylene particles
said particles having a thickness of about 20 to 1,000 microns, a length of 0.1 to 12 inches, and a width of 0.1 to 2 inches, and said particles being freely contained in said settling zone,
at a ratio of solid polymer solid surface area to emulsion volume of about 189 sq. ft. per cubic foot
while agitating the emulsion at an energy input level of about 0.01 H.P. per cubic foot of emulsion
with an impeller having a tip speed of about 10 feet per second
for an agitation time of about 10 seconds
terminating said agitation, and
allowing the emulsion to settle for a period of about 0.05 minute to about 2 minutes.

19. Apparatus for settling oil-in-water emulsions which comprises
an enclosed vessel having means for introducing thereinto and withdrawing therefrom an oil-in-water emulsion
an impeller-type agitating means positioned within said vessel
and driven by motor means providing an input energy of from 0.005 H.P. to 0.05 H.P. per cubic foot of vessel volume at a tip speed of less than 10 ft. per second
a plurality of particles freely contained within said vessel, said particles being composed of a polymer chosen from the group consisting of polytetrafluoroethylene and polytrifluorochloroethylene,
said particles having a thickness from 20 to 1,000 microns, a length from 0.1 to 12 inches, a width from 0.1 to 2 inches, and a surface area from about 5 to 200 sq. ft. per pound of particles,
the quantity of said particles being chosen to provide from about 5 to about 500 sq. ft. of particle area per cubic foot of vessel volume,
and screen means depending from said vessel in confronting relationship to said outlet means, whereby said particles are restrained from passing through said outlet means.

20. An apparatus in accordance with claim 18 wherein the inner surface of said vessel is coated with said polymer.

21. Apparatus in accordance with claim 19 wherein the polymer is polytetrafluoroethylene.

22. Apparatus in accordance with claim 19 further comprising vertically disposed baffle means dependent from and within said vessel, said baffle means being coated with said polymer wherein the total exposed coated surface is added to the surface area of the particles in determining the proper quantity of said particles.

23. Apparatus in accordance with claim 21 wherein said polymer is polytetrafluoroethylene.

24. Apparatus for continuously settling oil-in-water emulsions which comprises
an elongated horizontally disposed vessel having an inlet end and an outlet end,
wier means disposed within said vessel intermediate said inlet end and said outlet end, dividing said vessel into an agitation zone and a quiescent zone,
impeller-type agitation means positioned within said agitation zone
and driven by motor means providing an input energy of from 0.005 to 0.05 H.P./cu. ft. of agitation zone volume, at a tip speed of less than 10 ft. per second,
a plurality of polytetrahalogenatedethylene particles freely contained within said agitation zone in said quiescent zone,
said particles having a thickness from 20 to 1,000 microns, a length from 0.1 to 12 inches, a width from 0.1 to 2 inches, and a surface area from about 5 to about 200 sq. ft. per pound of particles,
the quantity of said particles being chosen to provide from about 5 to about 500 sq. ft. of particle area per cubic foot of agitation zone volume, and from about 20 to about 200 sq. ft. of particles per cubic foot of quiescent zone volume, means in said quiescent zone adjacent said outlet end for removing a supernatant oil phase and a settled aqueous phase,
and means for recirculating a portion of the polytetrahalogenatedethylene particles from the quiescent zone into the agitation zone.

25. Apparatus in accordance with claim 24 wherein the polytetrahalogenatedethylene is polytetrafluoroethylene.

26. Apparatus in accordance with claim 25 wherein the recirculating means comprises endless conveyor means having foraminous supports, and disposed within said vessel, extending into both said agitation zone and said quiescent zone.

References Cited

UNITED STATES PATENTS

| | | | |
|---|---|---|---|
| 2,767,847 | 10/1956 | Russell et al. | 210—208 X |
| 2,816,660 | 12/1957 | Bounin | 210—83 |
| 2,859,260 | 11/1958 | Stiles | 210—23 X |
| 3,179,603 | 4/1965 | Edwards et al. | 210—23 X |
| 3,272,787 | 9/1966 | Scoggin et al. | 210—83 X |
| 3,274,103 | 9/1966 | Adams | 210—23 |

REUBEN FRIEDMAN, *Primary Examiner.*

J. ADEE, *Assistant Examiner.*